(12) United States Patent
Kim

(10) Patent No.: US 7,261,123 B2
(45) Date of Patent: Aug. 28, 2007

(54) RESERVOIR TANK OF A POWER STEERING SYSTEM FOR A CAR

(75) Inventor: Min Jung Kim, Suwon (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 410 days.

(21) Appl. No.: 10/883,111

(22) Filed: Jul. 1, 2004

(65) Prior Publication Data

US 2005/0092375 A1    May 5, 2005

(30) Foreign Application Priority Data

Nov. 4, 2003    (KR) .................... 10-2003-0077542

(51) Int. Cl.
*B60T 11/26*    (2006.01)
(52) U.S. Cl. ............... 137/550; 137/574; 137/576; 60/454; 60/585
(58) Field of Classification Search ............... 137/574, 137/592, 550, 576; 60/453, 454, 585
See application file for complete search history.

(56) References Cited

U.S. PATENT DOCUMENTS

| | | | | |
|---|---|---|---|---|
| 2,483,448 A * | 10/1949 | Weitzen | .................. | 96/216 |
| 4,210,176 A * | 7/1980 | Emming | .................. | 137/574 |
| 4,424,829 A * | 1/1984 | Millington et al. | ......... | 137/590 |
| 4,809,745 A * | 3/1989 | Hormann | .................. | 137/574 |
| 4,964,983 A * | 10/1990 | Abe et al. | .................. | 210/168 |
| 5,356,535 A * | 10/1994 | Ueno et al. | .................. | 137/574 |
| 5,513,490 A * | 5/1996 | Howell et al. | .................. | 60/453 |
| 5,906,221 A * | 5/1999 | Mancell | .................. | 137/549 |
| 5,918,760 A * | 7/1999 | Frodin et al. | .................. | 137/574 |
| 6,155,336 A * | 12/2000 | Schwartz | .................. | 165/47 |
| 6,220,283 B1 * | 4/2001 | Saarinen et al. | ............ | 137/574 |
| 6,286,545 B1 * | 9/2001 | Moy et al. | .................. | 137/574 |
| 6,311,724 B1 * | 11/2001 | Tracey et al. | .................. | 60/454 |
| 6,382,245 B1 * | 5/2002 | Ito | .................. | 60/454 |
| 6,913,040 B2 * | 7/2005 | Crossman et al. | ............ | 60/453 |

* cited by examiner

*Primary Examiner*—John Rivell
(74) *Attorney, Agent, or Firm*—Morgan Lewis & Bockius LLP

(57) ABSTRACT

A reservoir tank of power steering system for a car includes an inlet port delivering oil through a swirl prevention member. The oil is then allowed to flow so swirl does not form in the oil flow of a reservoir tank. Furthermore, bubble formation in the oil is minimized.

8 Claims, 4 Drawing Sheets

RESERVOIR TANK OF A POWER STEERING SYSTEM FOR A CAR

CROSS REFERENCE TO RELATED APPLICATIONS

This application claims priority of Korean Application No. 10-2003-0077542, filed Nov. 4, 2003, the disclosure of which is incorporated herein by reference.

TECHNICAL FIELD OF THE INVENTION

The present generally relates to a reservoir tank of a power steering system for car. More specifically, a direction of oil flow in the reservoir tank is provided to prevent excessive formation of air bubbles.

BACKGROUND OF THE INVENTION

Typically, an automobile steering system controls the steering angle of a car. The system is used to change direction of the car while the car is moving. The system is a mechanical system that requires a large manipulation force to move wheels of the car to facilitate the direction change. To assist a driver, it has become conventional that a power steering system is used to offset the large manipulative force required such that easy and quick steering manipulation can be accomplished.

Such a power steering system operates through oil pressure generated from an oil pump driven off the engine of the car. A reservoir tank is usually provided in the flow path of power steering oil.

A drawback of the above system is that bubbles often form inside the reservoir. Upon the formation of bubbles, flow of the power steering oil is impeded. Therefore, a solution should be incorporated into the system and carried out to remove air bubbles from the reservoir tank.

SUMMARY OF THE INVENTION

According to a preferred embodiment, a reservoir tank of a power steering system for a car includes a body having an inlet port where power steering oil flows in and an outlet port where power steering oil flows out. A swirl preventing means is installed in the flow path between the inlet port and the outlet port.

A filter means is provided on one side of the swirl preventing means for filtering the oil. It is desirable that the swirl preventing means is integrally formed with the filter means. Additionally, it is desirable that the inlet port is located at a lower side relative to the outlet port and that the inlet port and the outlet port are placed up and down in parallel directions to each other toward the center of the body.

Preferably, a guide tube guides power steering oil that flows from the inlet port to the upward direction. The guide tube extends in the upward direction on the central axis line of the body. A swirl preventing means or partition means is installed at the guide tube and a plurality of oil discharge openings are formed at the partition means to distribute the oil flowing in from the guide tube uniformly in all directions and to discharge the oil.

BRIEF DESCRIPTION OF THE DRAWINGS

For better understanding of the nature and objects of the invention, reference should be made to the following detailed description, taken in conjunction with the accompanying drawings, in which.

DETAILED DESCRIPTION OF THE INVENTION

Figure 1:
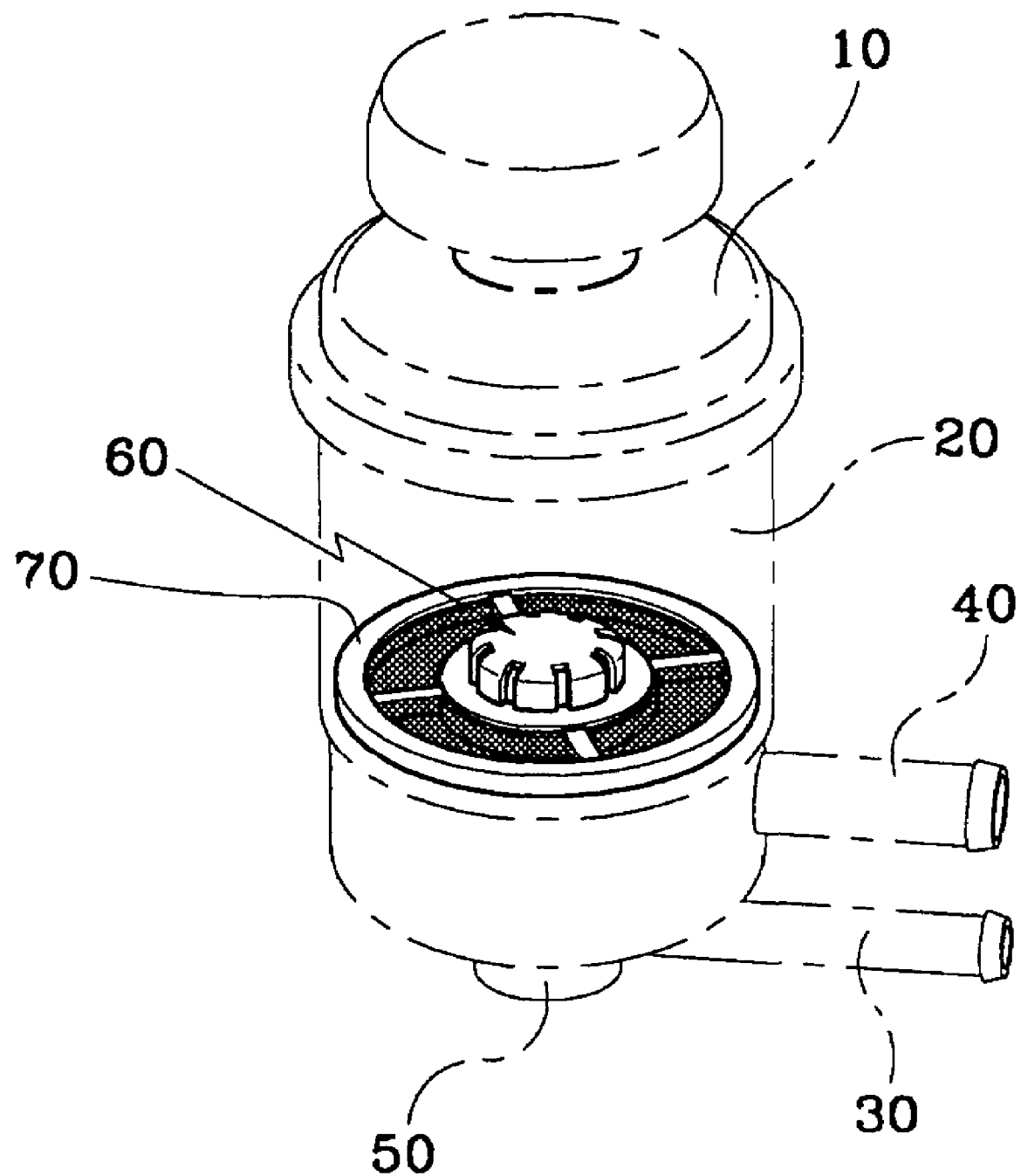
FIG. 1 is a schematic of a reservoir tank of a power steering system for a car according to an embodiment of the present invention.
Figure 2:
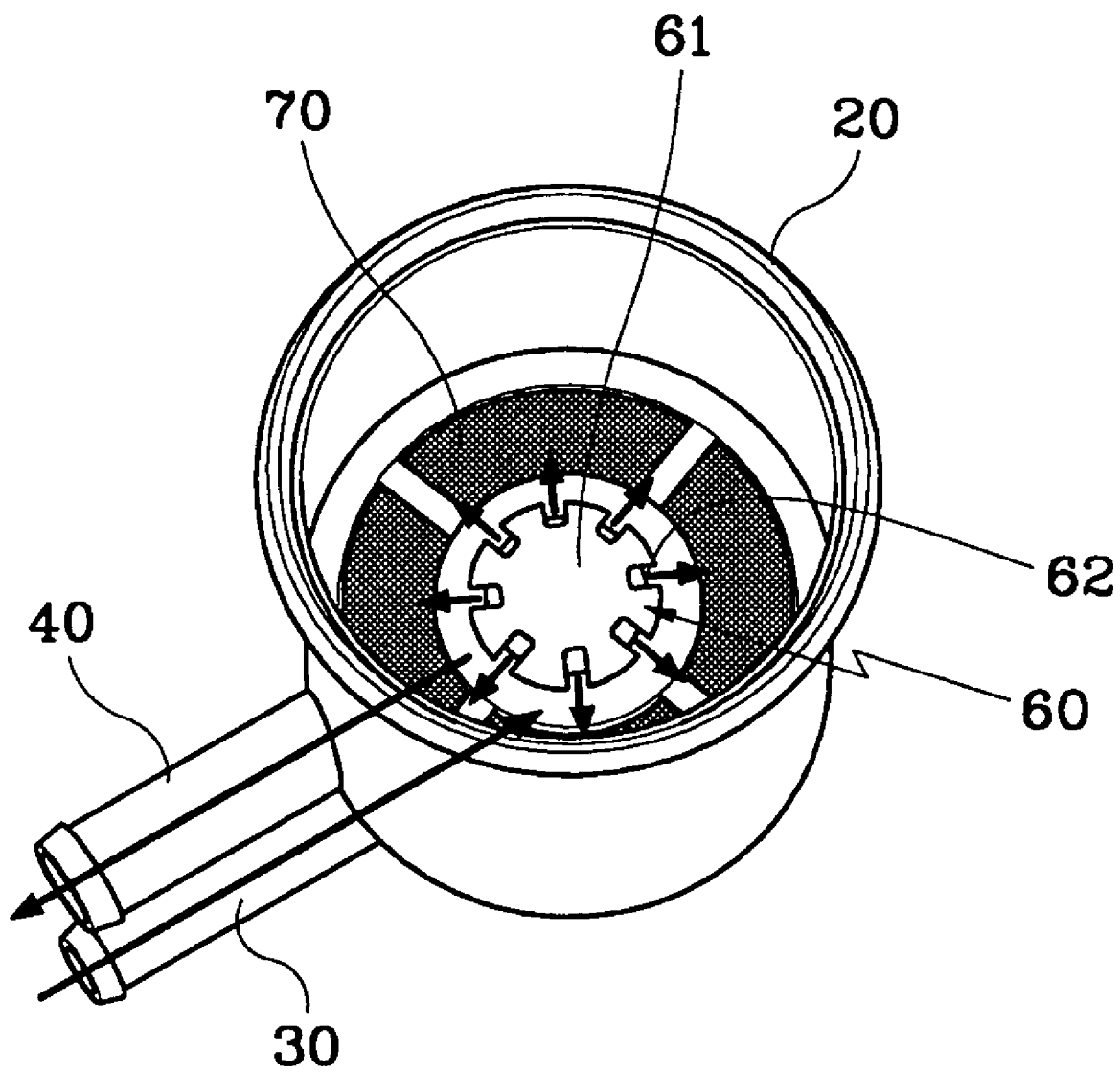
FIG. 2 is a perspective view illustrating a lower body of a reservoir tank according to another embodiment of the present invention.

According to FIG. 1, a reservoir tank of a power steering system for a car includes an upper body 10 and a lower body 20. The upper body 20 is connected with an inlet port 30 to which oil from a power steering cylinder returns and an outlet port 40 that is located relatively above the inlet port 30 and sends out oil to the lower body 20 with an oil pump. A guide tube 50 guides power steering oil flowing in from an inlet port 30 to an upward direction. The guide tube 50 is formed and extends upward inside the lower body 20. The guide tube 50 is connected to the inlet port 30 and a swirl preventing means 60 is located at the tip of the guide tube 50. It can be desirable that the guide tube 50 is installed on the central axis of the lower body 20.

Figure 3:
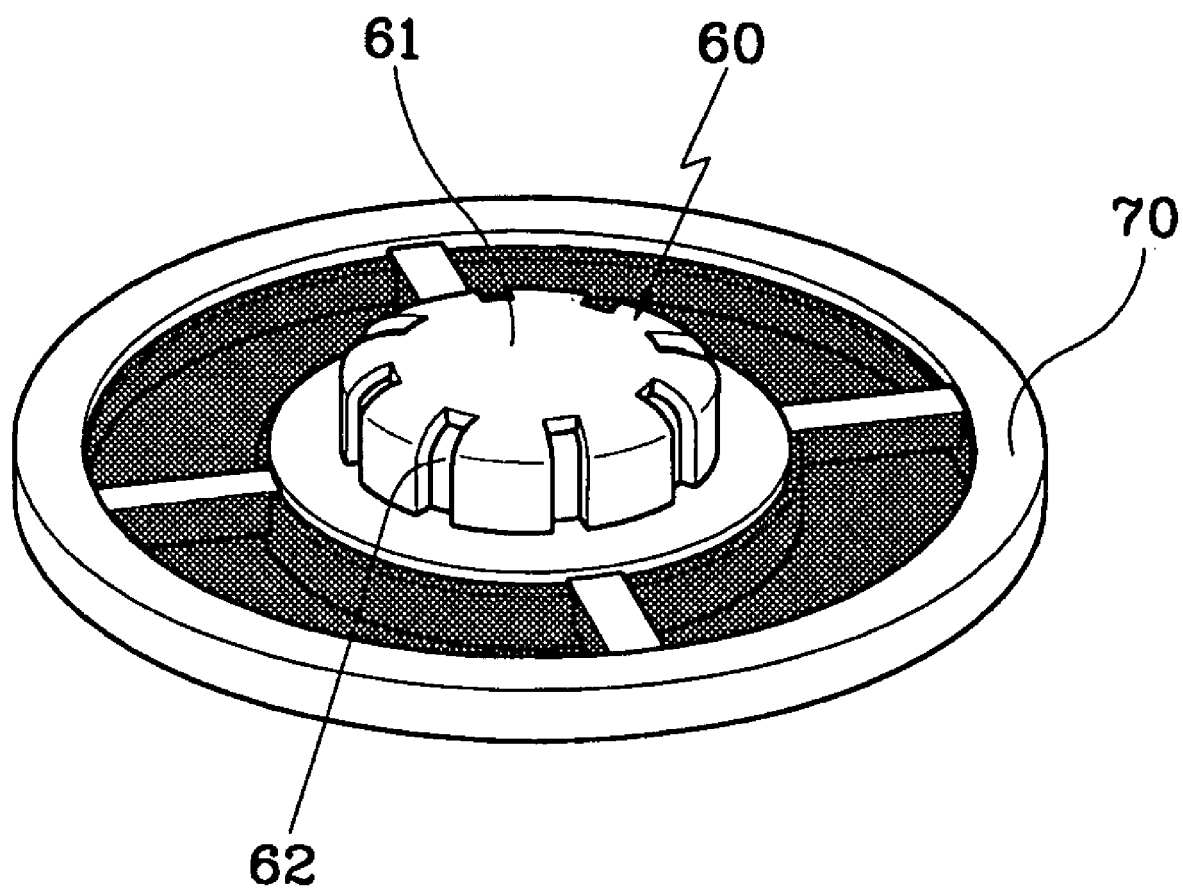
FIG. 3 is a perspective view of a swirl preventing means and filter means according to an embodiment of the present invention.

According to FIG. 3, a partition means 61 is positioned within the swirl preventing means 60 to distribute the oil flowing in from the guide tube 50. A plurality of oil discharge openings 62 are formed on one side of the bottom of the partition means 61. A filter means 70 is provided below the oil discharge openings 62 of the swirl preventing means 60. The filter means 70 is installed so that its edge part may be seated on a locking jaw 21 formed inside the lower body 20 in a strip form. It can be desirable that the swirl preventing means 60 is integrally formed with the filter means 70 so that its structure may be simplified.

Figure 4:
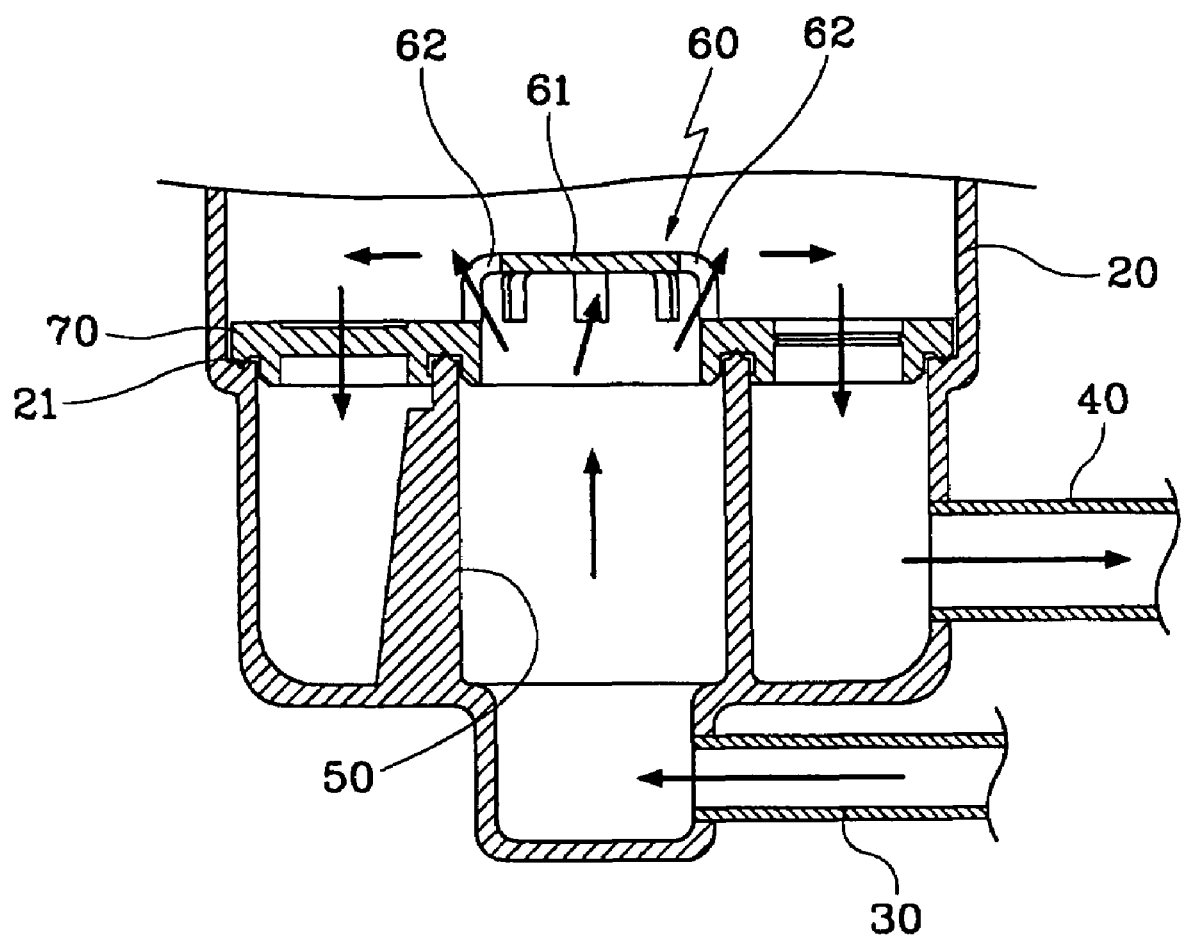
FIG. 4 illustrates a direction of flow within a lower body of a reservoir tank according to an embodiment of the present invention.

According to FIG. 4, a flow path of the oil is shown. In use, oil input through the inlet port 30 moves through a guide tube 50 to an upward direction before it is blocked by the partition means 61 of a swirl preventing means 60. The oil is then distributed uniformly in all directions through a plurality of oil discharge openings 62 and, thereafter, allowed to flow into the lower body 20.

Since the oil flowing in is blocked by the partition means 61 of the swirl preventing means 60 and distributed uniformly through the plurality of oil discharge openings 62, the oil does not swirl inside the lower body 20, therefore, bubble generation is minimized. Furthermore, the oil that has been distributed through the oil discharge openings 62 of the swirl preventing means 60 is filtered by a filter means 70 before being allowed to flow out through an outlet port 40.

According to another embodiment, an inlet port 30 and an outlet port 40 are arranged parallel to each other with the outlet port 40 being above the inlet port 30 and aligned toward the center of a reservoir tank or the center of the body 20. Thus the system requires less installation space in comparison to the situation where an inlet port and an outlet port are arranged side by side.

Although this invention has been explained in the above illustrating specific examples, this invention is not intended to be limited by the embodiments described above. A person skilled in the art may make a variety of modifications and alterations to these embodiments, and it is to be kept in mind that such modifications or corrections are included in the scope of this invention as defined by the appended claims.

What is claimed is:

1. A reservoir tank of a power steering system for a car, comprising:
   a body including an inlet port where a power steering oil flows in and an outlet port where the power steering oil flows out;
   a swirl preventing means installed in a flow path of the oil between said inlet port and said outlet port and located on a central axis of said body; and
   a filter means positioned around said swirl preventing means, wherein said filter means filters the oil.

2. The reservoir tank according to claim 1, wherein said swirl preventing means is integrally formed with said filter means.

3. The reservoir tank according to claim 1, wherein said inlet port is located relatively below said outlet port; and
   said outlet port is located relatively below said swirl preventing means.

4. The reservoir tank according to claim 1, wherein said inlet port and said outlet port are arranged parallel to each other and directed toward a center of said body.

5. The reservoir tank according to claim 1, further comprising a guide tube for guiding the power steering oil flowing from said inlet port into an upward direction, said guide tube being connected directly to said swirl preventing means.

6. The reservoir tank according to claim 1, wherein said swirl preventing means comprises a partition means installed at an outlet of a guide tube and a plurality of oil discharge openings formed at the partition means to distribute the oil from said guide tube uniformly in all directions before it is discharged.

7. The reservoir tank according to claim 5, wherein said guide tube is installed on the central axis of said body.

8. A reservoir tank of a power steering system, comprising:
   a reservoir tank body defining multiple interior compartments including a central lower portion, an outer lower portion, and an upper portion;
   an inlet port entering the central lower portion of said reservoir tank body such that said reservoir tank is in fluid communication with a power steering system;
   a cap positioned on an upper portion of the central lower portion of said reservoir tank, wherein said cap defines a plurality of slits such that the central lower portion of said reservoir tank body is in fluid communication with the outer lower portion and upper portion of said reservoir tank body; and
   a screen defining a plurality of oil discharge openings positioned between the outer lower portion and the upper portion of said reservoir tank such that oil is discharged evenly through said screen and enters the lower outer portion uniformly.

* * * * *